US012717971B2

(12) United States Patent
Mukherjee et al.

(10) Patent No.: US 12,717,971 B2
(45) Date of Patent: Aug. 25, 2026

(54) DORMANT MICROCODE RELATED SECURITY THREAT DETECTION AND PREVENTION

(71) Applicant: Bank of America Corporation, Charlotte, NC (US)

(72) Inventors: Maharaj Mukherjee, Poughkeepsie, NY (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 29 days.

(21) Appl. No.: 19/041,449

(22) Filed: Jan. 30, 2025

(65) Prior Publication Data

US 2026/0220307 A1 Jul. 30, 2026

(51) Int. Cl.
*H04L 29/06* (2006.01)
*G06F 21/64* (2013.01)
*H04L 9/32* (2006.01)
*H04L 9/40* (2022.01)

(52) U.S. Cl.
CPC ............ *G06F 21/64* (2013.01); *H04L 9/3236* (2013.01); *H04L 63/1425* (2013.01)

(58) Field of Classification Search
None
See application file for complete search history.

(56) References Cited

U.S. PATENT DOCUMENTS 9,294,486 B1 * 3/2016 Chiang ................... G06F 21/55
9,311,476 B2 4/2016 Stolfo et al.
9,363,280 B1 6/2016 Rivlin et al.
9,781,095 B2 10/2017 Cheng et al.
10,243,977 B1 * 3/2019 Govindarajan ..... H04L 63/1416
10,255,433 B2 * 4/2019 Takacs ................ G06F 21/6218
10,528,726 B1 1/2020 Ismael
10,855,702 B2 12/2020 Murphy et al.
11,316,886 B2 4/2022 Stelmar Netto et al.
11,372,982 B2 * 6/2022 Albero .................. G06F 21/568
11,451,581 B2 9/2022 Sirianni et al.
(Continued)

*Primary Examiner* — Maung T Lwin
(74) *Attorney, Agent, or Firm* — Banner & Witcoff, Ltd.

(57) ABSTRACT

An innovative system and method for detecting and mitigating dormant microcode threats embedded within legitimate software are disclosed. The invention introduces immutable code segments monitored for unauthorized modifications using hierarchical hash and checksum validation. Multi-level detection systems integrate Large Language Models (LLMs) to analyze behavioral deviations in code, identifying coordinated or anomalous activities. Upon detection of suspicious activity, mitigation protocols are activated, including localized micro jamming, network-wide mega jamming, and protective shielding of critical applications. A scorched earth policy ensures containment by halting processes with unusual growth patterns, while disaster recovery mechanisms restore verified backups to maintain operational integrity. The system's adaptive detection techniques, inspired by methods used to locate hidden threats in physical environments, enable proactive and resilient defense against microcode-based attacks. This solution addresses the limitations of conventional scanning technologies, providing robust protection for complex digital infrastructures against evolving internal and external security threats.

20 Claims, 9 Drawing Sheets

Sample Flow Diagram

(56) References Cited

U.S. PATENT DOCUMENTS

| | | | | |
|---|---|---|---|---|
| 11,481,484 | B2 * | 10/2022 | Albero | G06F 21/577 |
| 12,008,370 | B2 | 6/2024 | Thottethodi et al. | |
| 2011/0246778 | A1 * | 10/2011 | Duane | G06F 21/57<br>713/168 |
| 2021/0390182 | A1 * | 12/2021 | Boutnaru | G06F 8/433 |
| 2021/0406365 | A1 | 12/2021 | Neil et al. | |
| 2022/0188412 | A1 | 6/2022 | Borntraeger et al. | |
| 2024/0333747 | A1 * | 10/2024 | Parla | G06F 16/334 |

* cited by examiner

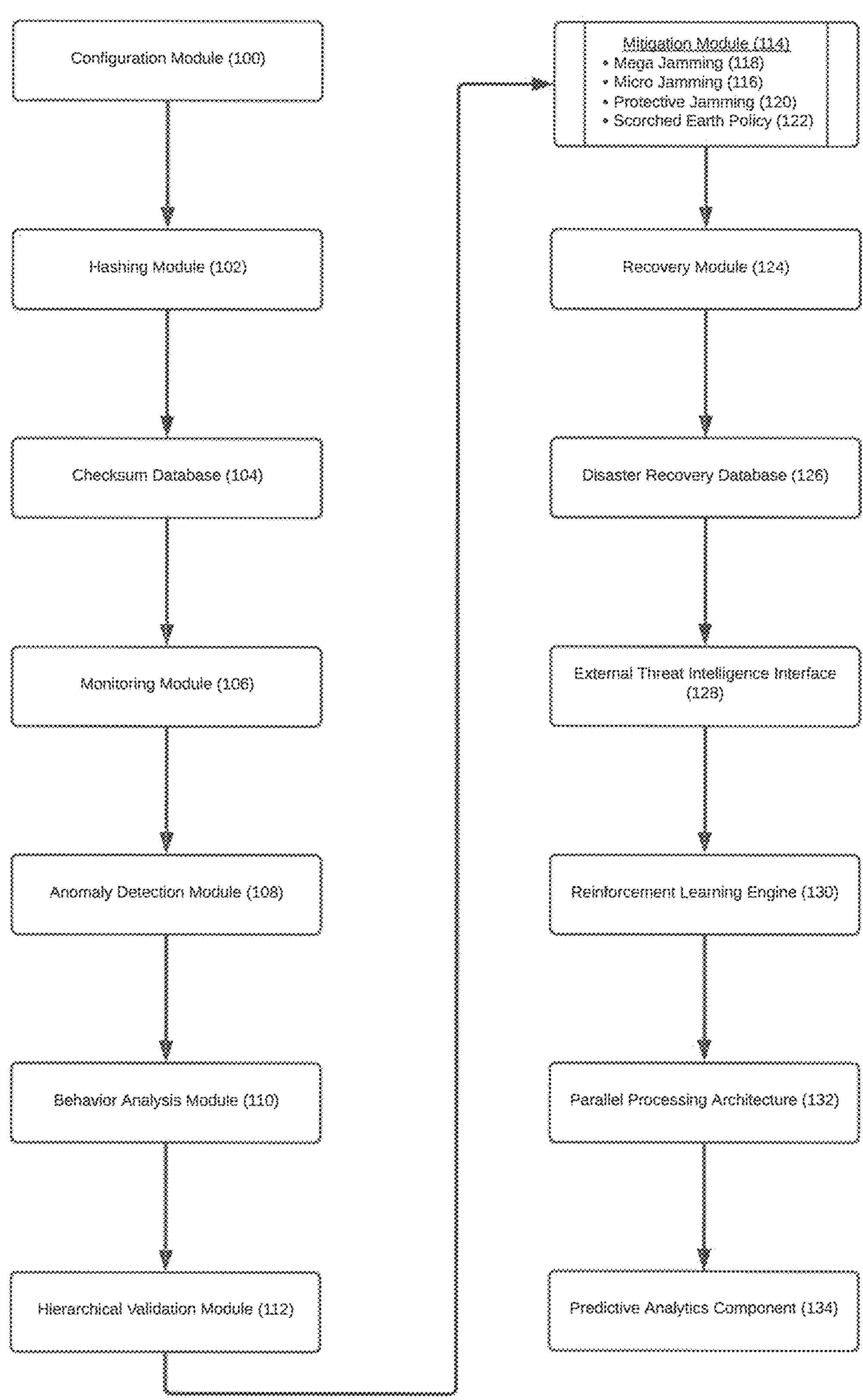
FIG. 1: Sample System Architecture Diagram

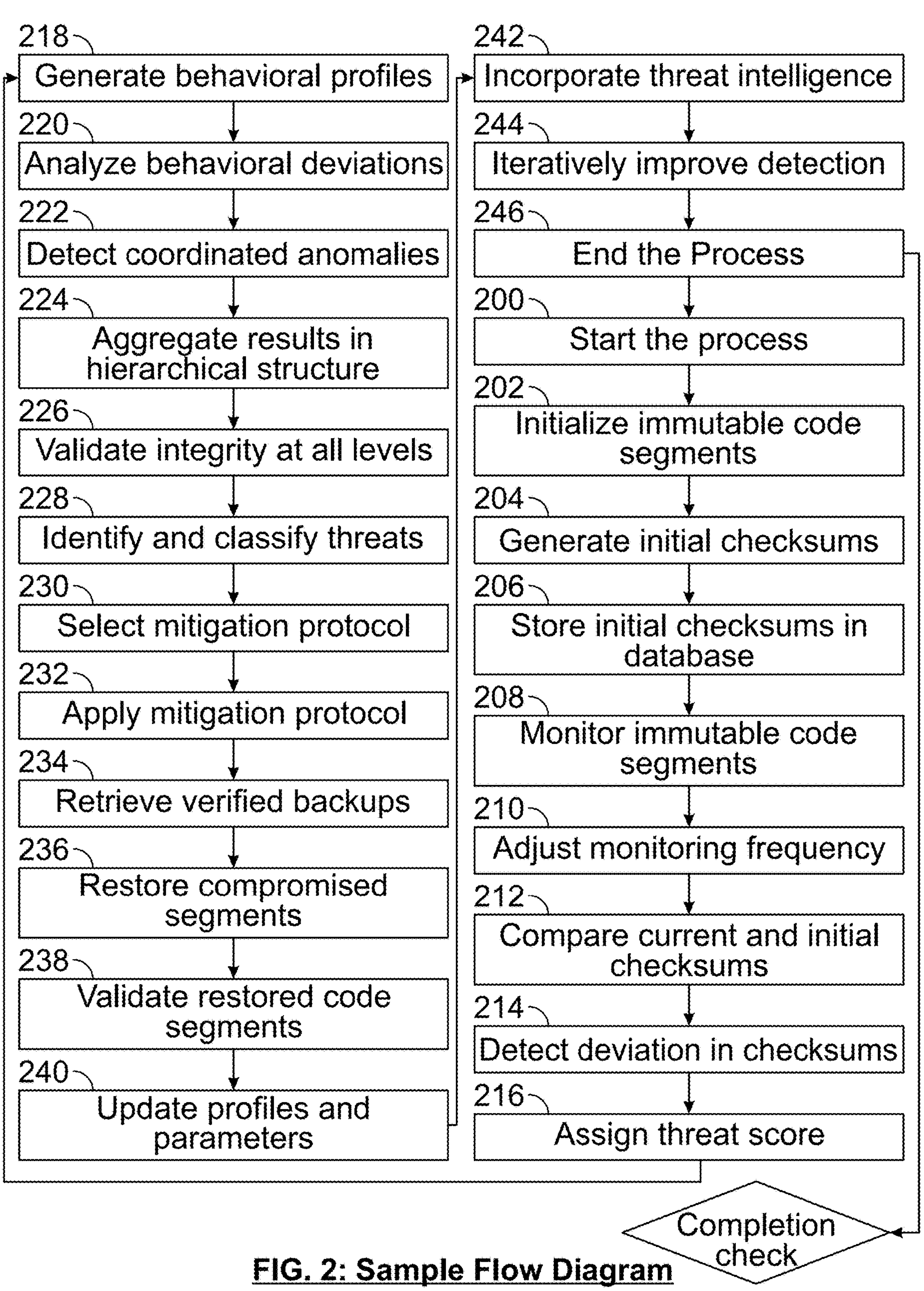
FIG. 2: Sample Flow Diagram

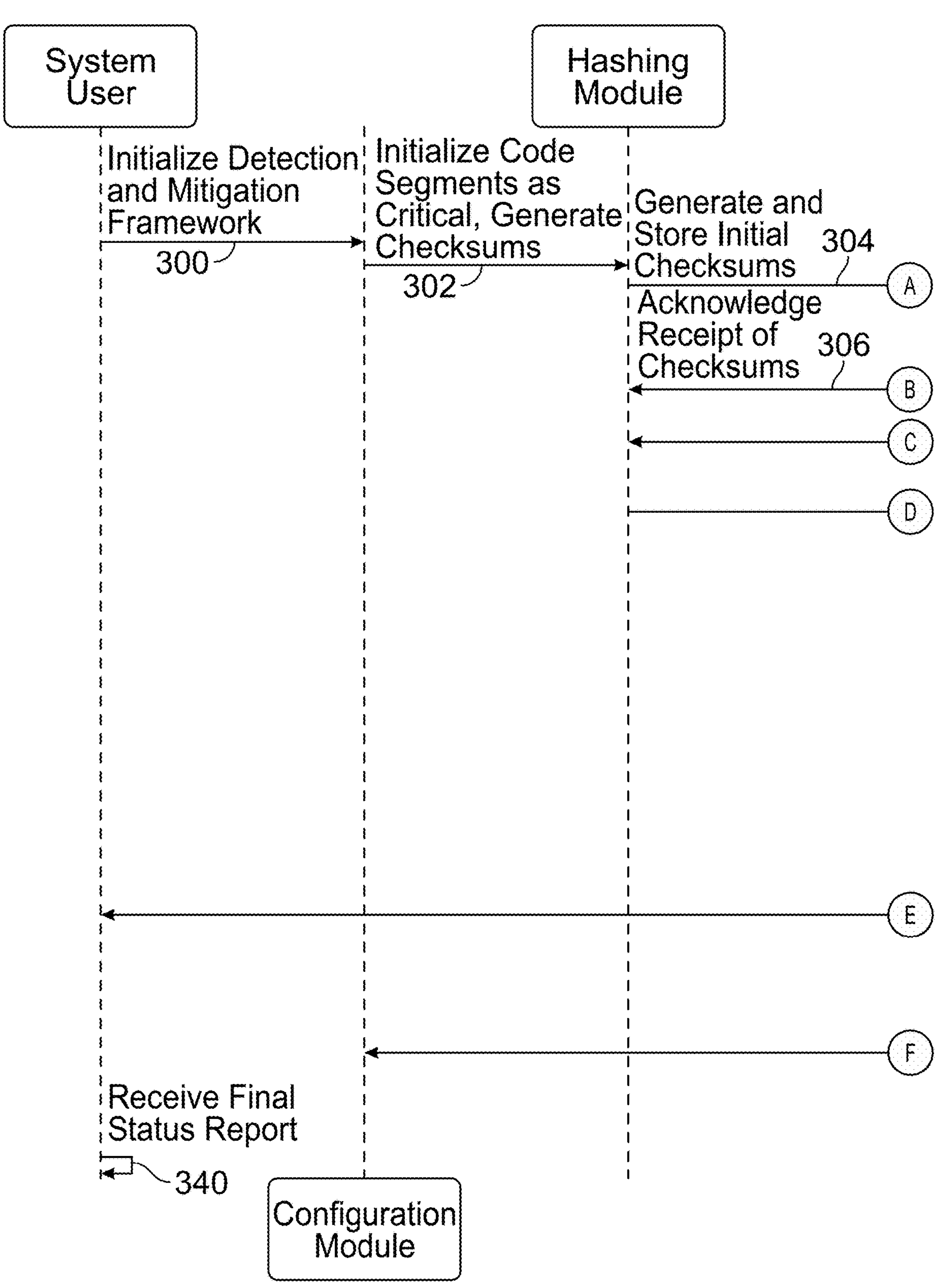
FIG. 3: Sample Sequence Diagram

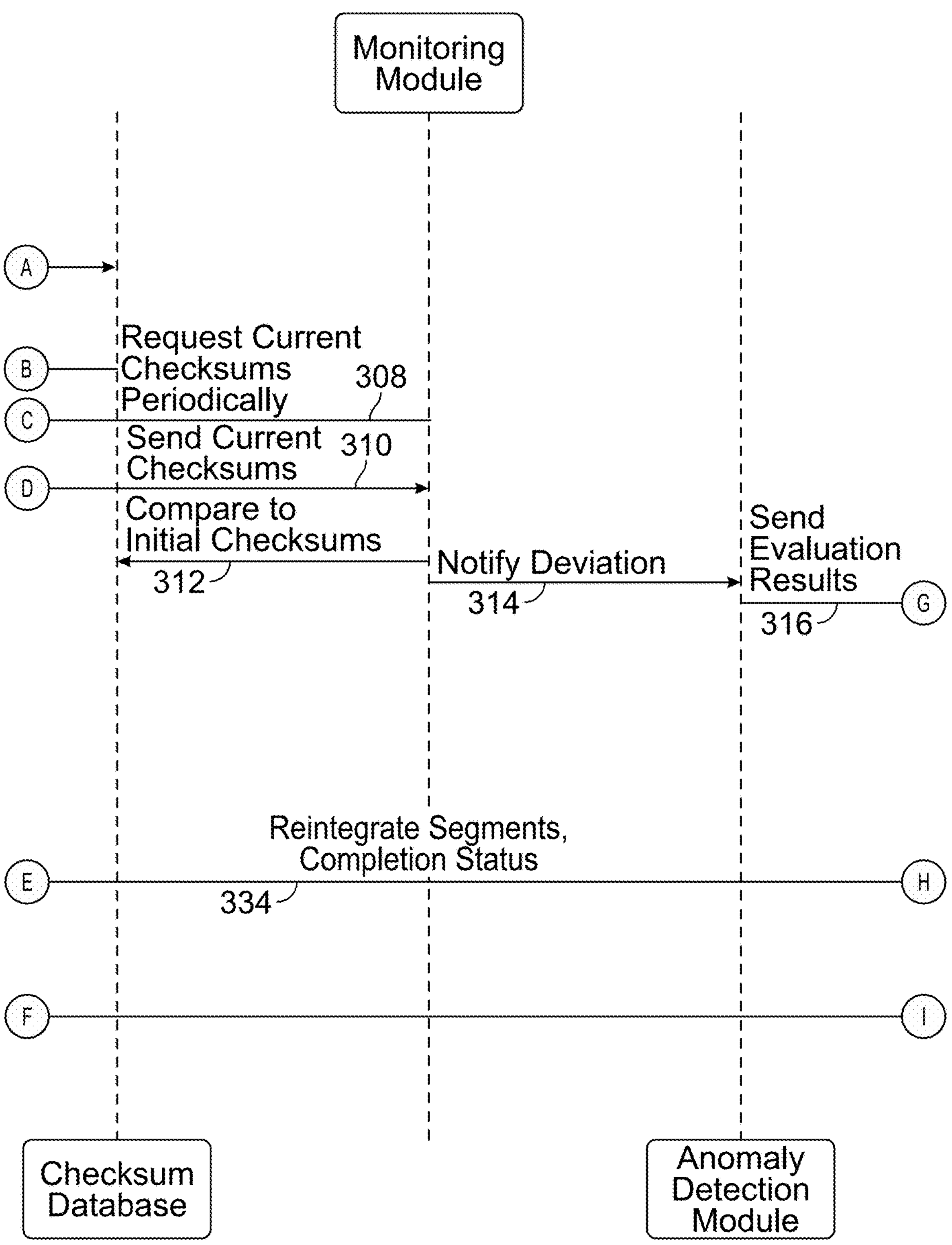
FIG. 3: Sample Sequence Diagram (continued)

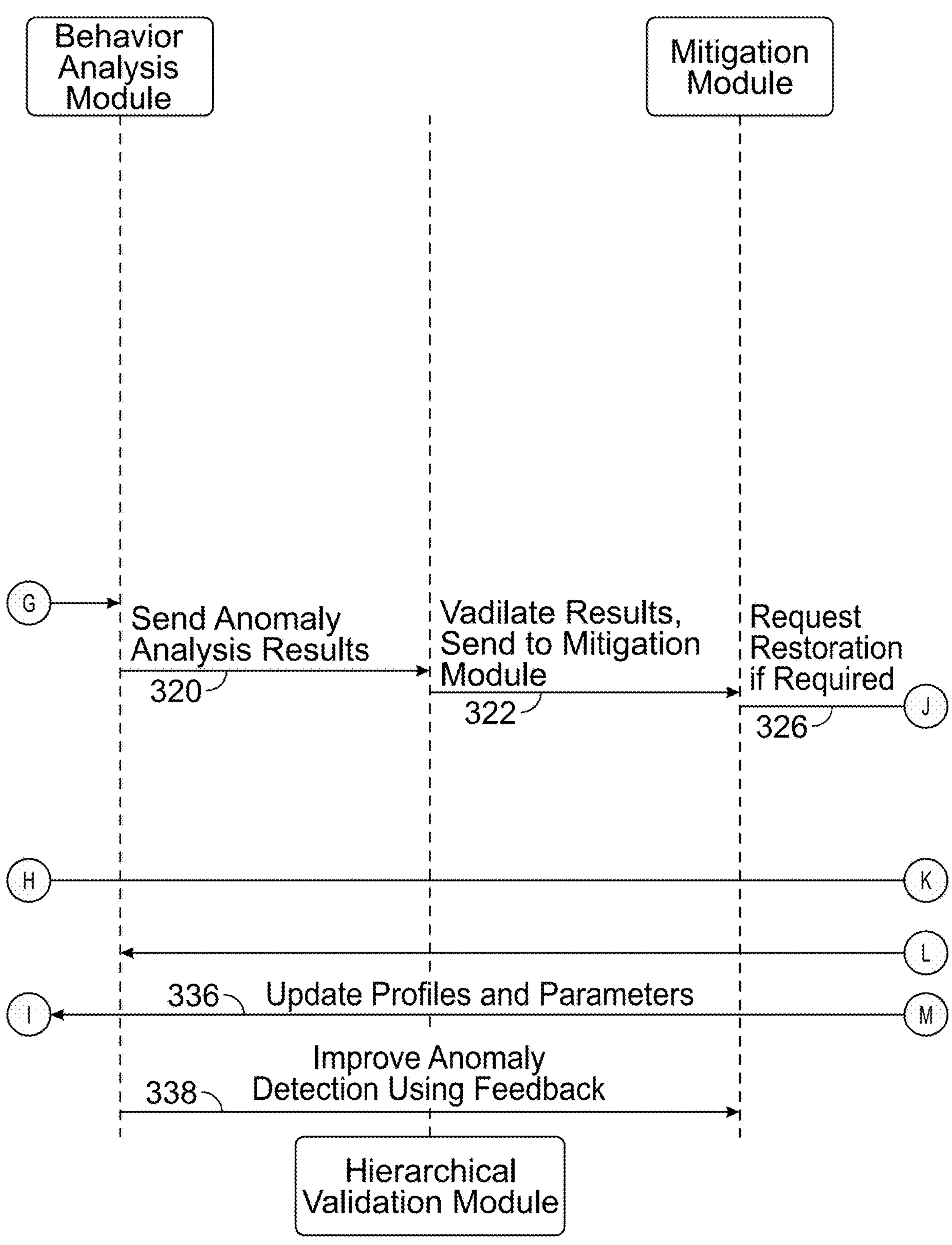
FIG. 3: Sample Sequence Diagram (continued)

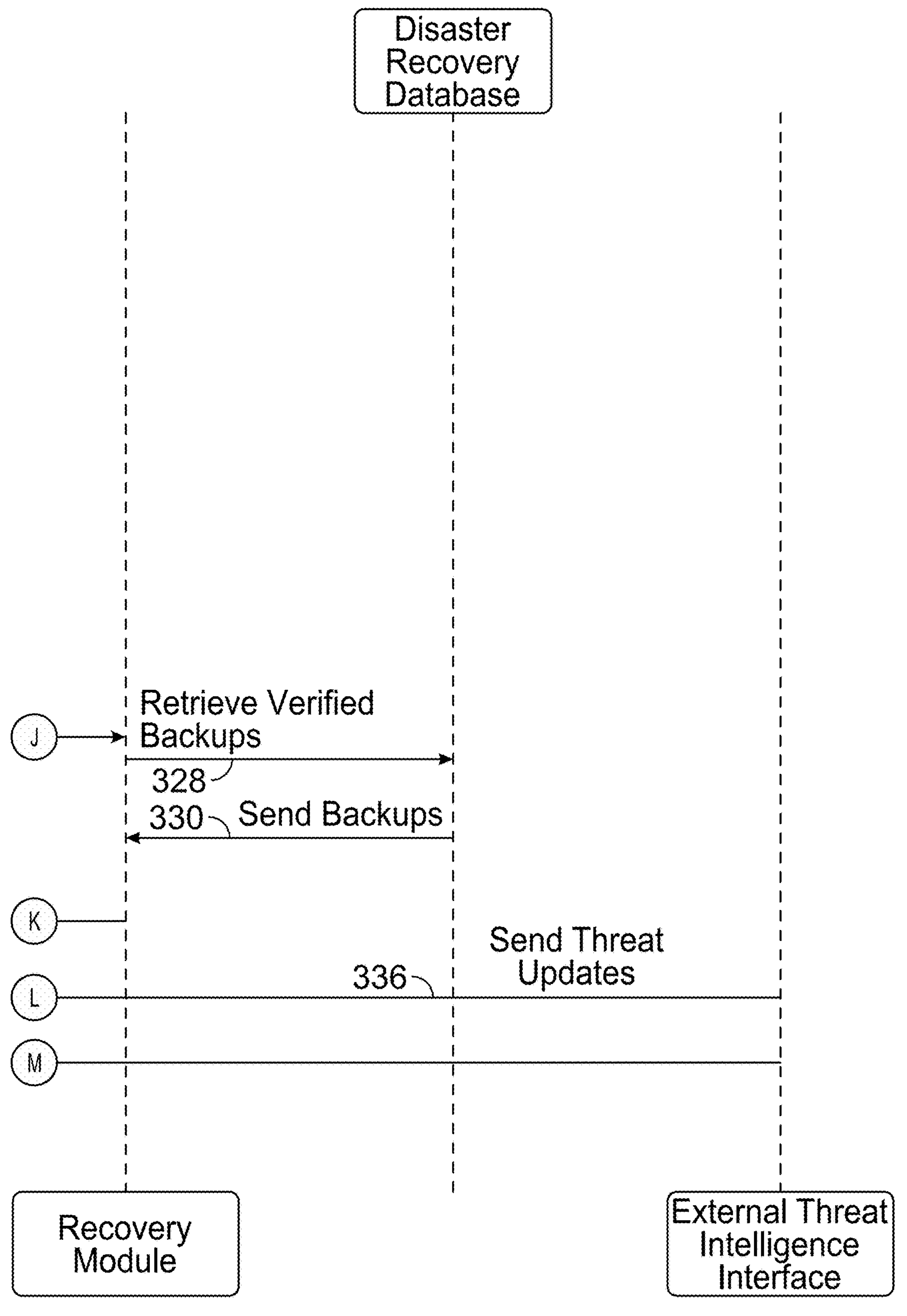
FIG. 3: Sample Sequence Diagram (continued)

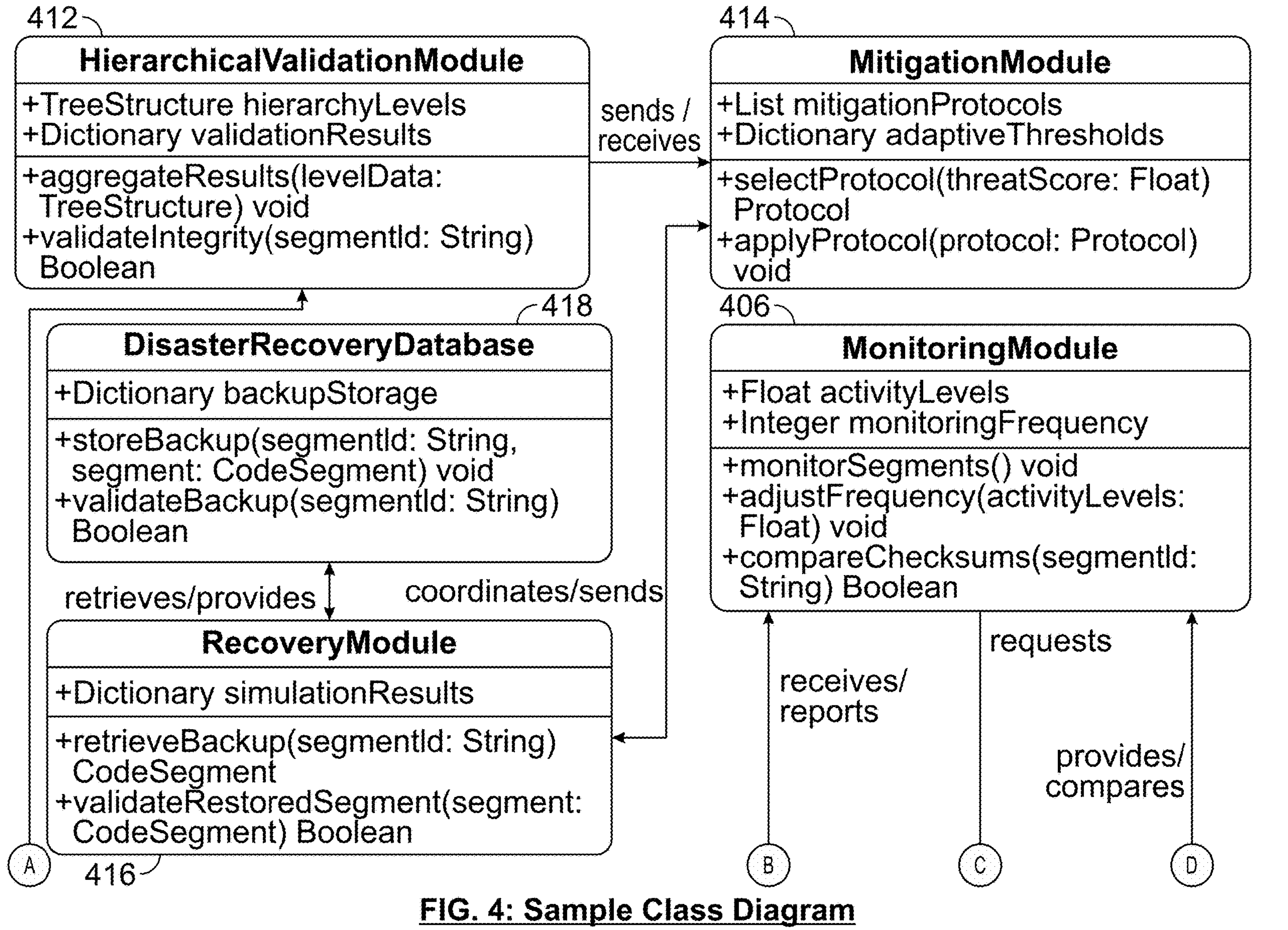
FIG. 4: Sample Class Diagram

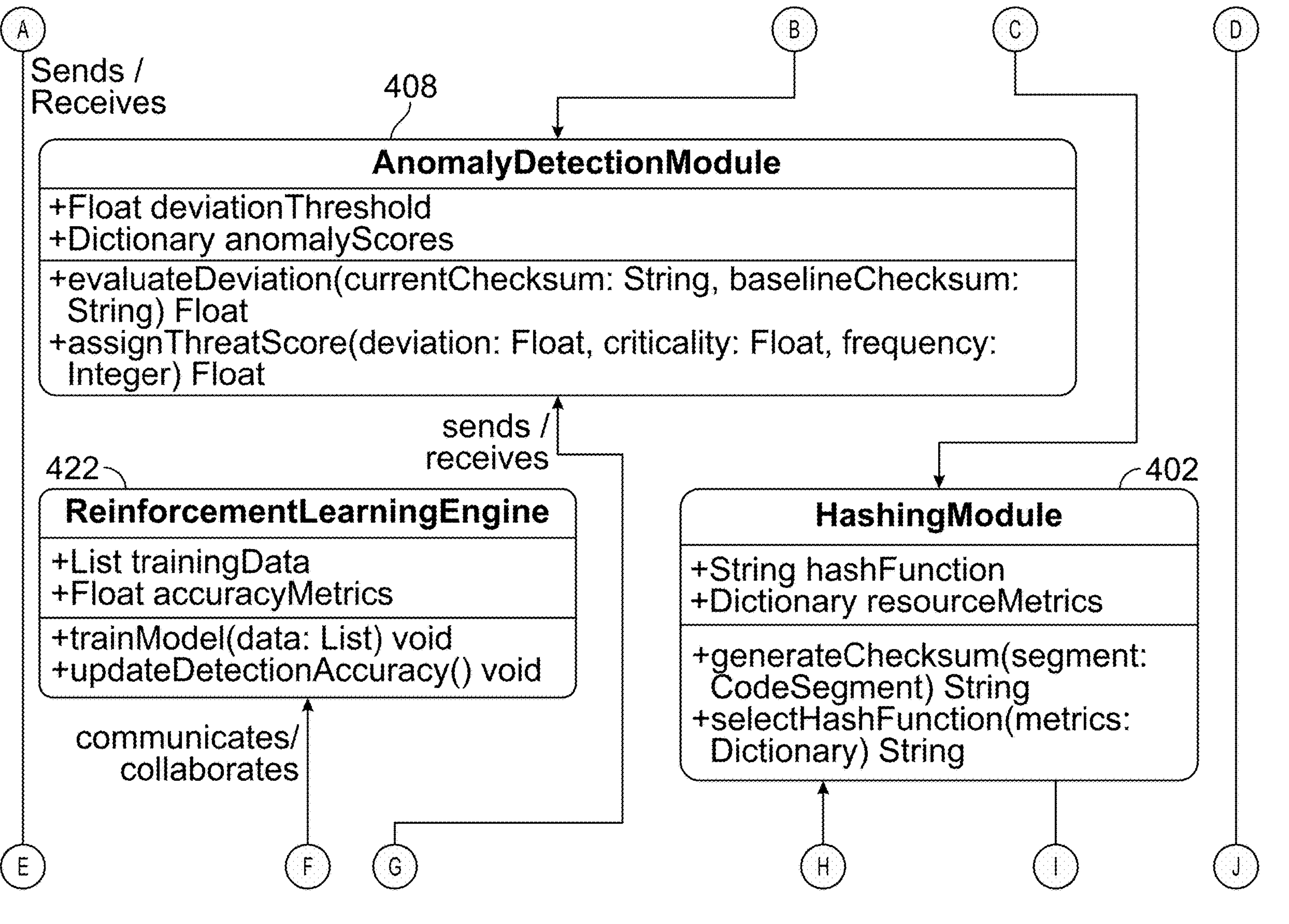
FIG. 4: Sample Class Diagram (continued)

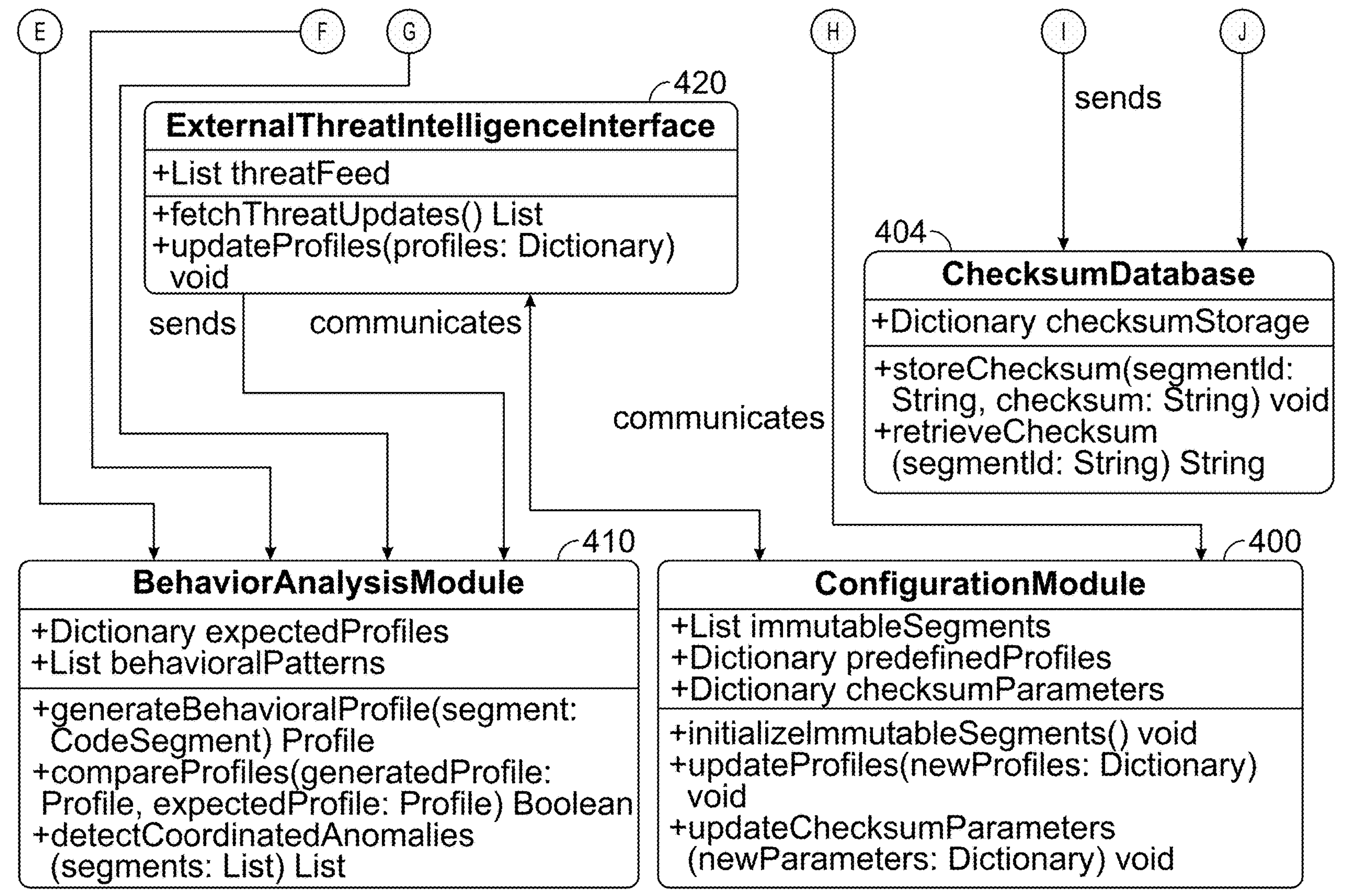
FIG. 4: Sample Class Diagram (continued)

DORMANT MICROCODE RELATED SECURITY THREAT DETECTION AND PREVENTION

TECHNICAL FIELD

The inventions disclosed herein pertain to the field of information security including the safeguarding of data and systems from unauthorized access, use, disclosure, disruption, modification, or destruction. Specifically, the invention addresses methods for detecting and preventing security threats posed by dormant microcode embedded within legitimate software. Utilizing immutable code monitoring, hierarchical checksums, large language models for anomaly detection, and advanced mitigation protocols, the invention ensures the integrity and resilience of complex digital infrastructures against evolving security threats.

DESCRIPTION OF THE RELATED ART

Modern computing environments face an ever-growing threat from malicious code embedded within software systems. These threats often originate as small, dormant pieces of code, which evade detection by appearing benign until they are activated. Traditional detection systems, designed to identify patterns of known malware, are frequently incapable of addressing these challenges because the dormant microcodes are not inherently malicious until they act. These microcodes target weaknesses in detection mechanisms, taking advantage of their small size, dispersed locations within the code, and ability to mimic legitimate operations. This creates a particularly insidious form of threat capable of remaining unnoticed for extended periods.

The rise of open-source software adoption and increased reliance on third-party components exacerbate the problem. Microcodes can be inadvertently introduced during integration or updates, bypassing even stringent verification processes. These microcodes are often embedded in ways that are indistinguishable from legitimate code, making it virtually impossible for traditional systems to detect them. Even advanced scanning tools fail to identify these threats because they focus on surface-level anomalies, which these microcodes carefully avoid. The issue is further compounded by the sheer volume of code in modern systems, making exhaustive manual or automated reviews impractical.

Insider threats represent another critical dimension of the problem. Individuals with access to internal systems may intentionally or unintentionally introduce malicious microcode. Insider threats are particularly dangerous because they operate within trusted environments, bypassing external defenses. Malicious insiders can craft microcodes that appear as harmless fragments of code, but when combined with other parts of the system, these fragments can trigger devastating attacks. This highlights the need for systems that can detect changes and anomalies even within trusted environments.

A significant challenge in managing this issue lies in the way these threats evolve. Dormant microcodes can remain inactive for months or even years, awaiting specific triggers or conditions to execute their malicious payload. During this time, they may spread throughout the system, embedding themselves in various components. Once activated, they often work in coordination to cause widespread disruption, such as data theft, system crashes, or the corruption of critical information. Traditional reactive approaches are ineffective because they fail to identify the threat during its dormant stage.

Modern detection systems rely heavily on known patterns and signatures to identify threats. This approach leaves systems vulnerable to novel attacks that do not match existing profiles. Dormant microcodes leverage this limitation by disguising themselves as legitimate processes or mimicking innocuous operations. By avoiding any behavior that would raise suspicion, they ensure their survival and eventual execution. This creates a persistent and evolving threat landscape that outpaces the capabilities of conventional detection methods.

The impact of these threats is far-reaching, affecting industries such as finance, critical infrastructure, and government operations. Organizations face financial losses, reputational damage, and legal liabilities when malicious microcodes compromise their systems. Furthermore, these threats undermine trust in software systems, particularly in sectors that rely heavily on automated processes and data integrity. The inability to detect and neutralize these threats before activation poses significant risks to global cybersecurity.

Existing methods for ensuring code integrity, such as static analysis and periodic audits, fall short of addressing the scale and complexity of this problem. Static analysis tools are limited by their inability to capture the dynamic behavior of microcodes, especially when these codes are designed to remain dormant. Periodic audits, while useful, cannot keep pace with the rapid changes and updates typical of modern software systems. This creates gaps in detection that attackers can target.

Another issue lies in the lack of real-time detection capabilities in existing systems. Many current methods operate on the premise of post-incident analysis, which is reactive and insufficient. By the time a malicious microcode is detected through traditional means, the damage is often already done. Real-time monitoring and anomaly detection are necessary to address this gap, but existing systems lack the granularity and precision required to identify microcodes without generating excessive false positives.

False positives themselves pose a significant challenge. Overly sensitive detection systems can flag legitimate processes as threats, leading to unnecessary disruptions and resource wastage. Organizations often disable or ignore overly sensitive systems, further exposing themselves to risk. Striking a balance between sensitivity and accuracy is essential but difficult to achieve with conventional tools. Dormant microcodes target this challenge by operating in ways that blend seamlessly with legitimate activity.

The increasing sophistication of attackers adds another layer of complexity. Threat actors are continually developing new techniques to bypass existing defenses, such as using distributed and encrypted microcodes. These techniques make it even more difficult to detect and isolate threats. The evolving nature of these attacks requires adaptive and proactive solutions that can anticipate and respond to new threats as they emerge. However, most existing systems lack the flexibility and foresight to meet this demand.

The potential for coordinated attacks involving multiple microcodes further complicates the issue. Dormant microcodes may operate independently or in concert with others to achieve a common goal. When activated, they can execute synchronized attacks that amplify their impact, such as shutting down critical systems or exfiltrating sensitive data. Detecting these coordinated efforts requires advanced analysis and detection methods capable of identifying patterns across distributed systems, which are absent in traditional approaches.

Organizations must also contend with the challenge of recovery and mitigation. Even when a threat is detected, the process of isolating and removing malicious microcodes can be time-consuming and disruptive. Conventional approaches often require shutting down entire systems to conduct thorough investigations, resulting in significant operational downtime. Furthermore, recovery efforts may inadvertently miss fragments of microcode, allowing threats to persist and reactivate later. This underscores the need for comprehensive and efficient mitigation strategies.

The problem is further exacerbated by the interconnectivity of modern systems. As software systems become increasingly integrated across networks and platforms, a single instance of dormant microcode can propagate widely, affecting multiple components. This interconnectedness amplifies the potential impact of an attack and complicates detection and mitigation efforts. Traditional approaches are ill-suited to handle such scale and complexity, leaving organizations vulnerable to cascading failures and widespread disruptions.

The long-felt and unmet need for this invention stems from the persistent inability of traditional methods to address the unique challenges posed by dormant microcodes. The evolving sophistication of these threats, coupled with their ability to evade conventional detection mechanisms, has left organizations vulnerable to significant risks. Despite advancements in cybersecurity, no existing solution has effectively combined the precision, adaptability, and scalability required to detect and mitigate these threats before they cause harm. This invention fulfills a critical gap by addressing the problem in a proactive and comprehensive manner, offering a solution that meets the demands of modern cybersecurity challenges.

SUMMARY OF THE INVENTION

The invention presents a sophisticated and comprehensive system for detecting and mitigating dormant microcode threats, which represent a unique and evolving challenge in modern software environments. At its core, the invention introduces the concept of immutable code segments, which are predefined portions of software identified as critical and unchanging under normal circumstances. These segments are integral to the system's operation, as they form a baseline for integrity monitoring. By defining these segments as immutable, the invention ensures that any alteration, however subtle, is immediately flagged for investigation. This proactive approach addresses the inherent limitations of traditional detection systems that rely on periodic scans or signature-based methods, which often miss novel or disguised threats.

The system employs hierarchical hash and checksum validation as a primary detection mechanism. These technologies are utilized to verify the integrity of both individual segments and the overall structure of the software. The hierarchical approach allows for multiple levels of validation, enabling the system to detect inconsistencies at granular levels and in the broader context of the codebase. This multi-level validation provides a robust safeguard against malicious modifications, ensuring that any unauthorized changes are identified quickly and accurately. The use of hierarchical hashing also minimizes false positives by isolating anomalies to specific segments of the code, reducing unnecessary disruptions and enabling targeted responses.

A unique feature of the invention is its integration of advanced large language models to analyze the behavioral patterns of the software. These models simulate the operational context of the software and compare observed behaviors with expected norms. This capability is particularly effective in identifying sophisticated threats that rely on mimicking legitimate operations to evade detection. By examining the functionality of the software at a behavioral level, the invention can detect anomalies that static analysis tools are unable to identify. This integration of behavioral analysis marks a significant advancement in cybersecurity, offering a dynamic and context-aware approach to threat detection.

Another innovative aspect of the invention is its multilayered detection hierarchy, which enhances its scalability and adaptability. This hierarchical structure divides the software into smaller, manageable segments, each subject to individual validation processes. The results of these validations are then aggregated and analyzed at higher levels, providing a comprehensive view of the system's integrity. This design ensures that the system remains effective across diverse software environments, including complex, distributed architectures and cloud-based platforms. The modularity of the system also allows for customization, enabling organizations to adapt the invention to their specific requirements without compromising its effectiveness.

The invention's mitigation protocols are designed to provide a flexible and layered response to detected threats. Upon identification of a potential anomaly, the system activates one or more mitigation strategies, depending on the severity and scope of the threat. These strategies include micro jamming, which isolates the affected segment of the software, and mega jamming, which isolates larger sections, such as entire networks or data centers. Protective jamming is another critical feature, creating a virtual shield around critical applications to ensure their continued functionality during a security event. This multi-tiered approach ensures that threats are contained effectively while minimizing collateral damage to legitimate operations.

A particularly innovative feature is the implementation of a scorched earth policy as a last-resort mitigation strategy. This policy targets all processes exhibiting unusual growth characteristics, halting their execution to prevent the spread of potential threats. While aggressive, this approach is complemented by robust disaster recovery mechanisms that allow for rapid restoration of affected systems. Verified backups are used to reestablish operational states, ensuring that disruptions are minimized and critical systems are restored quickly and securely. The combination of aggressive threat containment and efficient recovery reflects the invention's emphasis on both security and operational resilience.

The system's real-time monitoring capabilities further enhance its effectiveness. Unlike traditional methods that rely on periodic scans, the invention continuously analyzes the software for changes, ensuring that threats are identified as soon as they emerge. The use of immutable code segments provides a reliable baseline for this monitoring, enabling the system to detect even the smallest modifications. This real-time capability is particularly valuable in dynamic software environments, where updates and changes occur frequently. By maintaining constant vigilance, the invention ensures that threats are addressed promptly, reducing the risk of significant damage.

Adaptability is another key strength of the invention. Its modular design allows it to be implemented across a wide range of software environments, from on-premises systems to cloud-based infrastructures and hybrid models. This flexibility ensures that the invention remains relevant in diverse industries, including finance, manufacturing, critical infrastructure, and government operations. The system's ability to scale and adapt to varying requirements makes it a versatile tool for organizations seeking to enhance their cybersecurity posture.

The invention also incorporates advanced techniques for detecting coordinated attacks involving multiple microcodes. By analyzing patterns across distributed components, the system can identify threats that operate collaboratively to achieve their objectives. This capability is essential in addressing modern security threats, which often involve sophisticated, multi-faceted attacks designed to bypass conventional defenses. The invention's ability to detect and respond to these coordinated efforts underscores its comprehensive approach to threat detection and mitigation.

The use of checksum for checksums is a novel method introduced by the invention to enhance the accuracy and reliability of its detection processes. This method involves aggregating and validating the results of individual checksums to identify inconsistencies at higher levels of the software hierarchy. By providing an additional layer of validation, this technique ensures that even subtle anomalies are detected, reducing the risk of undetected threats. This innovative feature is particularly valuable in complex systems, where threats can propagate across multiple components.

The invention's emphasis on disaster recovery is another noteworthy aspect. Recognizing that mitigation measures can sometimes disrupt legitimate operations, the system includes mechanisms for restoring affected systems from verified backups. This ensures that organizations can quickly recover from security events, minimizing downtime and maintaining operational continuity. The disaster recovery framework also provides a safety net for aggressive mitigation strategies, allowing the system to prioritize containment without compromising long-term functionality.

The system's ability to detect dormant microcodes before they activate is a significant advancement in cybersecurity. By identifying threats during their dormant phase, the invention prevents them from causing harm, ensuring that systems remain secure and operational. This proactive approach addresses a critical gap in existing solutions, which often focus on reactive measures rather than prevention. The invention's emphasis on early detection and intervention reflects its commitment to providing robust and comprehensive security.

The invention's integration of behavioral analysis, hierarchical validation, and layered mitigation protocols represents a paradigm shift in the field of software security. Its unique features and innovative design provide a comprehensive solution to the challenges posed by dormant microcodes. Key aspects of the invention include immutable code, hierarchical hashing, behavioral analysis, large language models, micro jamming, mega jamming, protective jamming, checksum for checksums, anomaly detection, and disaster recovery. By combining these elements into a cohesive system, the invention offers a powerful and adaptable tool for protecting modern software environments from evolving threats.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for detecting and mitigating dormant microcode threats embedded within a software system includes initializing, by a configuration module, a plurality of immutable code segments within the software system, where each immutable code segment is designated as critical and unchanging under normal operational conditions. The method involves generating, by a hashing module, an initial checksum for each immutable code segment using a cryptographic hash function selected from the group consisting of SHA-256, SHA-3, and Blake2, where the cryptographic hash function is dynamically selected based on the computational resources available to the software system, and storing the initial checksum in a checksum database. The method further includes continuously monitoring, by a monitoring module, each immutable code segment during operation of the software system by periodically generating a current checksum for each immutable code segment and comparing the current checksum with the initial checksum stored in the checksum database, and identifying, by an anomaly detection module, an immutable code segment as modified if the current checksum deviates from the initial checksum by a deviation exceeding a predefined threshold. The method also includes analyzing, by a behavior analysis module comprising a large language model, operational behaviors of code segments within the software system, generating behavioral profiles for each code segment, and detecting anomalies by comparing the behavioral profiles with predefined expected profiles. Additionally, the method involves aggregating, by a hierarchical validation module, checksums and behavioral analysis results across multiple levels of a hierarchical structure representing the software system, where the hierarchical validation module employs a Merkle tree structure to enable efficient verification of the integrity of code segments at multiple levels and outputs aggregated validation results to higher levels of the hierarchy. The method concludes with initiating, by a mitigation module, a mitigation protocol upon detection of an anomaly, restoring, by a recovery module, affected portions of the software system using verified backups from a disaster recovery database, and validating the integrity of the restored software system.

In some arrangements, the monitoring module further includes a time-scheduled scanning component configured to adjust the frequency of checksum comparisons based on system activity levels, where higher activity levels result in increased monitoring frequency. The hashing module may further comprise a dynamic optimization component configured to switch between cryptographic hash functions based on real-time performance metrics and resource availability of the software system. The anomaly detection module can include a thresholding mechanism to evaluate the degree of deviation between the current checksum and the initial checksum, determining whether the modification constitutes a false positive or a genuine threat.

In some arrangements, the behavior analysis module is configured to detect coordinated anomalies across multiple code segments by identifying recurring patterns indicative of distributed dormant microcode threats. The hierarchical validation module can incorporate a parallel processing architecture to accelerate the aggregation and validation of checksums and behavioral analysis results across distributed components of the hierarchical structure. The mitigation module may dynamically adjust the scope of mitigation protocols based on a contextual analysis of the anomaly, evaluating interdependencies between the affected code segment and other system components.

In some arrangements, the recovery module includes a predictive analytics component to estimate the time required for restoration based on the size of the affected code segments, the complexity of the software system, and the availability of verified backups in the disaster recovery database. The external threat intelligence interface may categorize threat intelligence feeds into predefined threat classifications, mapping each classification to specific updates in the behavior analysis module and anomaly detection module to enhance targeted threat detection and response capabilities.

In some arrangements, the method incorporates feedback loops, where the behavior analysis module employs a reinforcement learning algorithm to iteratively improve its anomaly detection accuracy based on feedback from the mitigation module. The mitigation module provides feedback that includes success metrics for containment and restoration actions, ensuring improved performance in detecting and mitigating future threats.

These arrangements, as well as one or more combinations of portions thereof, collectively provide a robust and adaptable solution for detecting and mitigating dormant microcode threats within software systems.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates a comprehensive framework for detecting and mitigating dormant microcode threats within a software system. The diagram depicts interconnected modules and components, including configuration, hashing, monitoring, anomaly detection, behavior analysis, hierarchical validation, mitigation, and recovery modules, working together to ensure system integrity, security, and resilience.

FIG. 2 is an exemplary flow diagram in accordance with one or more embodiments disclosed herein that illustrates a detailed process for detecting and mitigating dormant microcode threats embedded within a software system. The flow diagram outlines key steps, including the initialization of immutable code segments, dynamic checksum monitoring, behavioral analysis, hierarchical validation, adaptive mitigation, and efficient recovery, ensuring the integrity and resilience of the system.

FIG. 3 is an exemplary sequence diagram in accordance with one or more embodiments disclosed herein that illustrates the detailed interactions between actors and components in a system for detecting and mitigating dormant microcode threats. The diagram outlines the step-by-step flow of processes, including initialization, monitoring, anomaly detection, behavioral analysis, hierarchical validation, mitigation, recovery, and system improvement through feedback and threat intelligence integration.

FIG. 4 is an exemplary class diagram in accordance with one or more embodiments disclosed herein that illustrates the architectural structure and interconnections between the functional components of the system for detecting and mitigating dormant microcode threats. The diagram defines key classes, their attributes, methods, and relationships, highlighting the collaborative functionality required for initializing, monitoring, analyzing, mitigating, and recovering from potential threats within the software system.

DETAILED DESCRIPTION

The invention is a highly advanced system and method for detecting and mitigating dormant microcode threats that may be embedded within a software system. These threats, often characterized by their ability to remain hidden and dormant until activated, present a significant challenge to traditional cybersecurity approaches. By introducing a comprehensive, multi-faceted architecture, the invention ensures a robust defense against such threats through a combination of immutable code monitoring, dynamic behavioral analysis, hierarchical validation, and adaptive recovery mechanisms. The system operates with precision and scalability, making it adaptable to a variety of environments and evolving security challenges.

A cornerstone of the invention is its use of immutable code segments. These segments are identified as critical to the system's operation and are initialized to remain unchanged under normal circumstances. The configuration module establishes these segments as a baseline for the system's monitoring capabilities, ensuring that any unauthorized modifications can be immediately identified. This process is supported by predefined behavioral profiles and checksum parameters that govern the detection and validation of changes to these segments. By creating a reliable foundation for monitoring, the invention ensures that all future operations are rooted in a secure and unalterable baseline.

To monitor the integrity of the immutable code segments, the system employs cryptographic checksums. The hashing module dynamically generates these checksums using a cryptographic hash function such as SHA-256, SHA-3, or Blake2. The choice of function is based on real-time performance metrics and available computational resources, ensuring that the system maintains both efficiency and security. These initial checksums are stored in a checksum database, which serves as a central repository for baseline integrity values. The secure storage of these values allows the system to perform comparisons with current checksums during subsequent monitoring phases.

The monitoring module is responsible for continuously tracking the integrity of the immutable code segments. It periodically generates current checksums for each segment and compares them to the baseline values stored in the checksum database. A dynamic time-scheduled scanning component adjusts the frequency of monitoring based on system activity levels. For example, during periods of increased activity, the module increases the frequency of integrity checks to account for the heightened risk of modifications. Conversely, during low activity periods, the module conserves system resources by reducing the monitoring frequency. This adaptive approach ensures that the system remains efficient while maintaining a high level of vigilance.

When deviations between current and initial checksums are detected, the monitoring module flags the affected segments for further analysis. These flagged anomalies are passed to the anomaly detection module, which evaluates the severity of the deviations. This module assigns a threat score to each anomaly by considering factors such as the magnitude of the deviation, the criticality of the affected segment, and the frequency of similar anomalies over a defined period. The threat score quantifies the potential impact of the anomaly, helping the system prioritize responses and allocate resources accordingly.

The behavior analysis module takes the analysis a step further by examining the operational behavior of the flagged code segments. This module utilizes a large language model to generate behavioral profiles, which capture the expected operational patterns of each segment. These profiles are compared to predefined expected profiles to detect any deviations that may indicate malicious activity. In addition to identifying anomalies within individual segments, the behavior analysis module has the unique ability to detect coordinated anomalies. By analyzing patterns across multiple segments, it can identify distributed dormant microcode threats that operate collaboratively, offering a level of insight that traditional methods cannot achieve.

A significant feature of the invention is its hierarchical validation module, which aggregates and validates integrity data across multiple levels of the software system. Using a Merkle tree structure, this module efficiently organizes and validates data, allowing the system to pinpoint the location of anomalies with precision. By providing a comprehensive view of the system's security state, the hierarchical validation module enhances the accuracy and effectiveness of threat detection. Its ability to localize threats to specific segments or regions reduces the risk of false positives and unnecessary disruptions.

The system's response to detected threats is managed by the mitigation module, which dynamically selects and applies the most appropriate mitigation protocol. The mitigation options include micro jamming, which isolates specific affected segments, and mega jamming, which isolates broader regions or entire networks. For critical threats, the module may deploy protective jamming to shield essential applications or implement a scorched earth policy to terminate all processes exhibiting unusual growth patterns. This layered approach allows the system to respond proportionately to the nature and severity of the detected threats, ensuring effective containment while minimizing collateral damage.

In cases where threats compromise system integrity, the recovery module ensures a secure restoration of affected components. This module retrieves verified backups from the disaster recovery database, which maintains a repository of backups validated for integrity and readiness. Once retrieved, the compromised segments are replaced with the backup versions, and simulation-based tests are conducted to validate the functionality and security of the restored segments. This ensures that the restored components meet the system's operational requirements before being reintegrated.

The invention also integrates external threat intelligence feeds to enhance its adaptability to emerging threats. These feeds provide real-time updates on new attack vectors, allowing the system to dynamically update its predefined profiles and detection criteria. The external threat intelligence interface communicates these updates to both the behavior analysis module and the configuration module, ensuring that the system remains aligned with the latest developments in cybersecurity.

Continuous improvement is a hallmark of the invention. The behavior analysis module incorporates a reinforcement learning engine that iteratively refines its detection capabilities based on feedback from the mitigation module. This feedback loop uses metrics on the success of containment and restoration efforts to enhance the accuracy and efficiency of anomaly detection. By learning from past incidents, the system evolves to address new challenges more effectively, maintaining its relevance in a rapidly changing threat landscape.

The modular design of the system allows it to be deployed across a variety of software environments, including on-premises, cloud-based, and hybrid infrastructures. Each module operates independently while maintaining seamless communication with the rest of the system. This modularity ensures scalability and customization, enabling the system to meet the unique security needs of industries such as finance and critical infrastructure.

The invention's hierarchical structure and dynamic capabilities provide a comprehensive framework for addressing dormant microcode threats. By combining immutable code monitoring, cryptographic validation, advanced behavioral analysis, adaptive mitigation, and efficient recovery, the invention delivers an unparalleled level of security. Its integration of real-time threat intelligence and reinforcement learning further enhances its ability to respond to evolving threats with precision and efficiency, making it a state-of-the-art solution in modern cybersecurity.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage.

These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLAMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 illustrates a comprehensive system architecture for detecting and mitigating dormant microcode threats embedded within a software system. The system includes interconnected modules and components, each identified by a unique number, that collectively implement a robust, dynamic, and adaptive framework for monitoring, detecting, mitigating, and recovering from security threats. Each component is designed to perform a specific function, with all elements working in tandem to ensure the integrity, functionality, and resilience of the software system.

At the core of the system is the configuration module (100), which initializes a plurality of immutable code segments within the software system. These segments are designated as critical and unchanging under normal operating conditions to serve as baselines for integrity monitoring. The configuration module also dynamically adapts predefined expected profiles and checksum parameters based on newly detected threats, ensuring the system's continued effectiveness against emerging security challenges. This module communicates with other components to ensure that the initialization and adaptation processes integrate seamlessly into the overall system.

The hashing module (102) generates an initial checksum for each immutable code segment. This checksum serves as the baseline for future integrity validation. The hashing module dynamically selects a cryptographic hash function from a set that includes SHA-256, SHA-3, and Blake2. The selection is based on real-time performance metrics and resource availability, ensuring that the hashing process is both secure and efficient. The generated checksums are stored in the checksum database (104), which provides a secure and persistent repository for these baseline integrity values. The checksum database is structured to support rapid access and comparison operations, allowing other components to retrieve baseline values efficiently.

The monitoring module (106) continuously tracks the integrity of the immutable code segments. It periodically generates current checksums for each segment and compares these checksums to the corresponding initial values stored in the checksum database (104). The monitoring module includes a time-scheduled scanning component that dynamically adjusts the frequency of these comparisons based on the system's activity levels. When activity levels increase, the scanning frequency is adjusted to ensure a higher level of vigilance, reducing the risk of undetected anomalies. This dynamic scheduling ensures an optimal balance between system performance and security.

Anomalies are identified and classified by the anomaly detection module (108). This module evaluates deviations between current checksums and initial checksums. If a deviation exceeds a predefined threshold, the anomaly detection module assigns a threat score based on several factors, including the degree of deviation, the criticality of the affected segment, and the frequency of similar anomalies within a specified time window. The threat score helps prioritize responses, ensuring that the system focuses on the most critical threats. This module works closely with other components, such as the monitoring module (106) and behavior analysis module (110), to provide a holistic analysis of potential threats.

The behavior analysis module (110) integrates a large language model to analyze operational behaviors of code segments. It generates behavioral profiles for each segment and compares these profiles to predefined expected profiles to detect deviations. This module extends its functionality to identify coordinated anomalies by recognizing recurring patterns indicative of distributed dormant microcode threats across multiple segments. The behavior analysis module incorporates a reinforcement learning engine (130) that iteratively improves its detection accuracy over time. This engine uses feedback from the mitigation module (114), including metrics on containment and restoration success, to refine the model and enhance future threat detection.

The hierarchical validation module (112) aggregates checksums and behavioral analysis results across multiple levels of a hierarchical structure representing the software system. It employs a Merkle tree structure to enable efficient validation of integrity at each level. This structure facilitates rapid aggregation and comparison of data, ensuring that anomalies can be localized to specific levels of the hierarchy. To enhance the system's performance, the hierarchical validation module incorporates a parallel processing architecture (132) that accelerates these operations, particularly in distributed and complex systems.

When a genuine threat is detected, the mitigation module (114) initiates a tailored mitigation protocol. This module offers multiple mitigation strategies, including micro jamming (116), which isolates the specific affected code segment, and mega jamming (118), which isolates a broader region of the system, such as a network or datacenter. Protective jamming (120) creates a shield around critical applications to ensure their uninterrupted functionality during a security event. For severe threats, the scorched earth policy (122) terminates all processes exhibiting unusual growth patterns. The mitigation module includes an adaptive decision-making component that dynamically selects the appropriate protocol based on a severity score calculated from the outputs of the anomaly detection module (108) and behavior analysis module (110).

The recovery module (124) restores affected portions of the software system by retrieving verified backups from the disaster recovery database (126). This database stores backups that are periodically validated for integrity, ensuring their readiness for restoration when needed. The recovery module validates the operational functionality of restored code segments using simulation-based tests that replicate real-world conditions. These tests ensure that restored segments are fully operational and secure before reintegration into the system. Additionally, the recovery module incorporates a predictive analytics component (134) that estimates restoration time based on the size of affected segments, system complexity, and backup availability.

The external threat intelligence interface (128) integrates real-time threat intelligence feeds into the system. This interface categorizes threats into predefined classifications and maps each classification to updates in the behavior analysis module (110) and anomaly detection module (108). These updates ensure that the system remains adaptive to emerging threats and incorporates the latest security insights into its detection mechanisms.

Overall, FIG. 1 depicts a highly detailed and interconnected architecture that leverages state-of-the-art technologies and methodologies to address the challenges posed by dormant microcode threats. Each module is designed to perform specific functions while seamlessly interacting with other components, creating a cohesive system capable of robust detection, efficient mitigation, and rapid recovery. The architecture supports real-time monitoring, adaptive responses, and continuous improvement, ensuring the system's effectiveness in dynamic and complex software environments.

FIG. 2 illustrates an exemplary flow diagram that outlines the detailed process for detecting and mitigating dormant microcode threats embedded within a software system. This flow diagram showcases the step-by-step execution of the system's functionality, as described in the invention, and incorporates all key features, processes, and limitations from the method and system claims, including dynamic monitoring, behavioral analysis, hierarchical validation, mitigation protocols, and adaptive recovery mechanisms.

The process begins with an initialization step where the system activates the detection and mitigation framework (200). This ensures all modules and components are operational and ready to execute their respective tasks. Following this, the configuration module initializes a plurality of immutable code segments within the software system (202). These segments are identified as critical and are designated as unchanging under normal conditions, providing a baseline for integrity verification.

Next, the hashing module generates initial checksums for each immutable code segment (204). These checksums are created using cryptographic hash functions, such as SHA-256, SHA-3, or Blake2, dynamically selected based on real-time system resource availability to optimize performance. These initial checksums are securely stored in the checksum database (206), creating a persistent repository for future integrity comparisons.

The monitoring module then begins continuously tracking the immutable code segments (208). It periodically generates current checksums and compares them to the initial checksums stored in the database. To optimize system efficiency, the monitoring module includes a time-scheduled scanning component that dynamically adjusts the frequency of checksum generation based on the system's activity levels (210). Higher activity levels trigger more frequent monitoring to ensure that potential threats are detected promptly.

The system proceeds to compare the current checksums with the initial checksums stored in the database (212). If any deviation is detected (214), the system flags the associated code segment as potentially compromised. The anomaly detection module evaluates the deviation, assigning a threat score based on factors such as the degree of deviation, the criticality of the affected segment, and the frequency of similar anomalies (216). This score helps prioritize subsequent actions, focusing on the most severe threats.

Simultaneously, the behavior analysis module generates operational behavioral profiles for the monitored code segments (218). These profiles are analyzed by comparing them to predefined expected profiles to detect deviations in code behavior (220). The behavior analysis module extends this capability by identifying coordinated anomalies across multiple code segments (222), leveraging pattern recognition to detect distributed dormant microcode threats that operate collaboratively.

To enhance detection accuracy and scope, the hierarchical validation module aggregates checksums and behavioral analysis results across multiple levels of a hierarchical structure (224). Using a Merkle tree structure, the module validates integrity at each level and outputs aggregated results to higher levels for a comprehensive analysis (226). This hierarchical approach localizes anomalies and ensures efficient integrity checks across complex software architectures.

Once threats are identified and classified (228), the mitigation module dynamically selects an appropriate protocol based on the threat severity score (230). Mitigation strategies include micro jamming (isolating specific affected segments), mega jamming (isolating broader regions or networks), protective jamming (shielding critical applications), and, in severe cases, a scorched earth policy (terminating processes with unusual growth patterns) (232). The mitigation protocol ensures containment of the threat while minimizing disruption to unaffected components.

If restoration is required, the recovery module retrieves verified backups from the disaster recovery database (234). This database stores backups that are periodically validated for integrity, ensuring they are ready for immediate deployment. The recovery module replaces compromised code segments with these backup versions (236) and validates the operational functionality of the restored segments using simulation-based tests that replicate real-world conditions (238). These tests ensure the restored segments meet performance and security requirements before reintegration into the system.

To maintain the system's adaptability, the configuration module updates predefined expected profiles and checksum parameters based on newly detected threats (240). Additionally, the system integrates external threat intelligence feeds (242), enriching the behavior analysis and anomaly detection modules with real-time insights into emerging security threats. This ensures that the system remains responsive to the evolving cybersecurity landscape.

The behavior analysis module further incorporates a reinforcement learning engine that iteratively improves anomaly detection accuracy (244). This engine uses feedback from the mitigation module, including metrics on containment and restoration success, to refine its models and enhance future detection capabilities. Finally, the process concludes when all identified threats are mitigated, affected segments are restored, and the system is securely operational (246).

Thus, FIG. 2 provides a detailed representation of the invention's functional flow, highlighting the integration and interaction of its components. The process emphasizes precision, adaptability, and resilience, ensuring robust detection, effective mitigation, and efficient recovery from dormant microcode threats in complex software systems.

FIG. 3 is an exemplary sequence diagram that depicts sample interactions between the actors and components of the system designed to detect and mitigate dormant microcode threats within a software system. This sequence begins when the System User initializes the system to activate the detection and mitigation framework by issuing a request to the Configuration Module. This initial action (300) sets the entire system in motion, ensuring that all components and processes are prepared to monitor, detect, mitigate, and recover from potential security threats.

Upon receiving the initialization request, the Configuration Module takes responsibility for identifying and initializing a plurality of immutable code segments (302). These segments, which are critical to the operation of the software, are designated as unchanging under normal conditions to provide a reliable baseline for monitoring integrity. Following the initialization of these segments, the Configuration Module communicates with the Hashing Module to generate initial checksums for each immutable code segment (304). These checksums are created using cryptographic hash functions dynamically selected based on the system's available resources and performance requirements. The Hashing Module dynamically determines the most suitable hash function from a set that includes SHA-256, SHA-3, and Blake2, ensuring a balance between computational efficiency and security.

The initial checksums generated by the Hashing Module are securely stored in the Checksum Database (306). This database acts as a central repository for baseline integrity values and is designed for secure and efficient retrieval during integrity validation. Once the baseline checksums are established, the Monitoring Module begins periodic tracking of the immutable code segments (308). This module continuously requests current checksums from the Hashing Module at dynamically scheduled intervals. These intervals are adjusted in real-time based on the activity levels of the software system, a feature that ensures heightened vigilance during periods of increased activity while conserving system resources during low-activity periods.

In response to each monitoring request, the Hashing Module generates current checksums for the specified code segments and transmits these values back to the Monitoring Module (310). The Monitoring Module then performs a comparison between the current checksums and the initial checksums retrieved from the Checksum Database (312). If the comparison reveals no deviations, the system continues monitoring without interruption. However, if a deviation is detected (314), the Monitoring Module flags the associated code segment as potentially compromised and immediately notifies the Anomaly Detection Module for further analysis.

The Anomaly Detection Module evaluates the flagged segment by analyzing the degree of deviation between the current and initial checksums, the criticality of the segment within the system, and the frequency of similar anomalies over a defined time period (316). It assigns a threat score to quantify the severity of the anomaly and sends its evaluation results to the Behavior Analysis Module for additional scrutiny. The Behavior Analysis Module, which incorporates a large language model, generates operational behavioral profiles for the flagged code segments (318). These profiles are then compared against predefined expected profiles to identify deviations in behavior (320). The module extends its capabilities to detect coordinated anomalies by analyzing recurring patterns across multiple segments, identifying distributed dormant microcode threats that operate collaboratively to execute malicious actions (322).

The results from both the behavioral analysis and checksum validation processes are sent to the Hierarchical Validation Module (324). This module aggregates data across multiple levels of a hierarchical structure representing the software system. By employing a Merkle tree structure, the Hierarchical Validation Module validates the integrity of each level in the hierarchy and provides aggregated results for comprehensive system analysis (326). Any anomalies detected are classified as either genuine threats or false positives based on the contextual data and severity scores provided by the Anomaly Detection Module and the Behavior Analysis Module (328).

When a genuine threat is identified, the Mitigation Module dynamically selects the most appropriate mitigation protocol (330). The selection process evaluates the severity score and chooses from a range of strategies, including micro jamming to isolate specific affected segments, mega jamming to contain broader regions or networks, protective jamming to shield critical applications, or a scorched earth policy to terminate all processes exhibiting unusual growth patterns. The selected mitigation protocol is applied to contain and neutralize the identified threat (332).

If the threat requires restoration of compromised code segments, the Mitigation Module communicates with the Recovery Module to initiate the retrieval of verified backups (334). The Recovery Module retrieves these backups from the Disaster Recovery Database (336), a repository that maintains periodically validated backup versions to ensure their integrity and readiness for restoration. The Recovery Module replaces the compromised segments with the verified backups and validates the restored segments using simulation-based tests that replicate real-world operational conditions (338). These tests confirm that the restored segments meet the required performance and security standards before being reintegrated into the software system.

Throughout the entire process, the External Threat Intelligence Interface plays a critical role by providing real-time updates on emerging threats (340). These updates are sent to both the Behavior Analysis Module and the Configuration Module, enriching the detection and mitigation capabilities of the system with the latest threat intelligence. The Behavior Analysis Module further incorporates a reinforcement learning engine that iteratively improves its anomaly detection accuracy based on feedback from the Mitigation Module (342). This feedback includes metrics on the success of containment and restoration actions, enabling the system to enhance its response to future threats.

The sequence concludes when the System User receives a comprehensive status report from the system, indicating that all detected threats have been mitigated and the system has been securely restored to its normal operational state (344). FIG. 3 illustrates the precise and coordinated interactions between actors and components, showcasing the invention's ability to provide a robust and adaptive solution to the challenges posed by dormant microcode threats. The detailed sequence ensures thorough detection, effective mitigation, and efficient recovery, making the system a vital tool for maintaining security and resilience in complex software environments.

FIG. 4 is an exemplary class diagram that comprehensively illustrates the architectural structure of the system designed to detect and mitigate dormant microcode threats embedded within a software system. This diagram captures the interplay between various classes, each representing a functional component of the system, along with their attributes, methods, and relationships. The interconnected classes are designed to collaboratively address the complex processes of threat detection, mitigation, and recovery while ensuring adaptability and precision across diverse scenarios.

At the core of the system is the Configuration Module (400), which serves as the foundational component for initializing and configuring critical system parameters. This class maintains attributes such as 'immutableSegments', which represents a list of code segments designated as critical and unchanging under normal operating conditions. Additionally, it stores 'predefinedProfiles', a dictionary of expected behavioral norms for various code segments, and 'checksumParameters', another dictionary containing specific parameters required for checksum generation and validation. The Configuration Module provides methods like 'initializeImmutableSegments( )', which sets up immutable segments for monitoring, and dynamic update functions such as 'updateProfiles(newProfiles)' and 'updateChecksum Parameters(newParameters)', allowing the system to adapt to new threats and evolving operational requirements. This module interfaces with multiple components, including the Hashing Module (402) for checksum initialization and the External Threat Intelligence Interface (420) for integrating real-time threat intelligence updates.

The Hashing Module (402) plays a vital role in generating cryptographic checksums for the immutable code segments. It uses attributes such as 'hashFunction' to identify the hash algorithm in use and 'resourceMetrics' to monitor system resources and optimize the choice of hash function dynamically. Methods s like 'generateChecksum(segment)' compute the checksum for a given code segment, while 'selectHashFunction(metrics)' ensures that the most appropriate cryptographic function, such as SHA-256, SHA-3, or Blake2, is selected based on current resource availability. The generated checksums are securely transmitted to the Checksum Database (404), ensuring their persistence and readiness for validation.

The Checksum Database (404) serves as a secure repository for managing the baseline integrity data of all immutable code segments. Its primary attribute, 'checksumStorage', organizes checksums in a dictionary format, mapping each segment identifier to its respective checksum. The database includes methods such as 'storeChecksum(segmentId, checksum)' for saving checksum data and 'retrieveChecksum(segmentId)' for providing the baseline checksum values needed for integrity comparisons. The database supports the Monitoring Module (406) by facilitating efficient retrieval and validation operations.

The Monitoring Module (406) oversees the continuous tracking of immutable code segments to detect potential deviations. Attributes like 'activityLevels' capture real-time measurements of system activity, while 'monitoringFrequency' adjusts the monitoring intervals dynamically in response to these activity levels. Its methods, including 'monitorSegments( )' and 'adjustFrequency(activityLevels) ', initiate the monitoring process and calibrate the frequency of checksum generation. Additionally, 'compareChecksums (segmentId)' compares current checksum values with those stored in the Checksum Database (404). Upon detecting deviations, the module flags the anomalies and notifies the Anomaly Detection Module (408) for further analysis.

The Anomaly Detection Module (408) evaluates the flagged anomalies to assess their severity and assigns threat scores to guide subsequent actions. Key attributes include 'deviationThreshold', which defines acceptable limits for checksum variations, and 'anomalyScores', which store the calculated threat scores for each anomaly. The methods 'evaluateDeviation(currentChecksum, baselineChecksum)' and 'assignThreatScore(deviation, criticality, frequency)' analyze the magnitude of anomalies and prioritize them for detailed scrutiny by the Behavior Analysis Module (410).

The Behavior Analysis Module (410) utilizes a large language model to generate and analyze behavioral profiles for code segments. Its attributes include 'expectedProfiles', which store the predefined norms for code behavior, and 'behavioralPatterns', which record observed patterns for comparison. Methods such as 'generateBehavioralProfile (segment)' and 'compareProfiles(generatedProfile, expectedProfile)' identify deviations between actual and expected behaviors. The module further detects coordinated anomalies by using the method 'detectCoordinatedAnomalies(segments)' to analyze patterns indicative of distributed dormant microcode threats. This class communicates results to the Hierarchical Validation Module (412) and refines its detection capabilities with the assistance of the Reinforcement Learning Engine (422).

The Hierarchical Validation Module (412) aggregates validation data across a multi-level structure that represents the software system. Its attributes include 'hierarchyLevels', a tree structure organizing the data hierarchically, and 'validationResults', which store the aggregated outcomes. Methods such as 'aggregateResults(levelData)' and 'validateIntegrity(segmentId)' ensure the integrity of code segments at all levels, leveraging a Merkle tree structure for efficient validation. This module sends its findings to the Mitigation Module (414) for appropriate responses.

The Mitigation Module (414) dynamically selects and applies mitigation protocols to address detected threats. Attributes such as 'mitigationProtocols', a list of available strategies, and 'adaptiveThresholds', which adjust response thresholds based on context, ensure flexible threat management. Methods like 'selectProtocol(threatScore)' and 'applyProtocol(protocol)' execute specific strategies, such as micro jamming, mega jamming, protective jamming, or a scorched earth policy, to contain and neutralize threats. The module collaborates with the Recovery Module (416) when restoration is required.

The Recovery Module (416) retrieves backups from the Disaster Recovery Database (418) and validates the functionality of restored code segments. Its attributes include 'simulationResults', which capture the outcomes of validation tests, and methods such as 'retrieveBackup(segmentId)' and 'validateRestoredSegment(segment)' ensure secure and functional restoration. The Disaster Recovery Database (418) maintains the verified backups in 'backupStorage' and provides methods like 'storeBackup(segmentId, segment)' and 'validateBackup(segmentId)' to support restoration operations.

The External Threat Intelligence Interface (420) enriches the system with real-time threat updates. Its attribute 'threat- Feed' holds current intelligence data, while its methods 'fetchThreatUpdates( )' and 'updateProfiles(profiles)' dynamically adapt the system to evolving threats. The Reinforcement Learning Engine (422) improves detection accuracy over time by leveraging its attributes 'trainingData' and 'accuracyMetrics' and methods such as 'trainModel(data)' and 'updateDetectionAccuracy( )'.

Thus, FIG. 4 provides a detailed and interconnected view of these classes, showcasing the comprehensive and adaptive architecture of the system. Each class is integral to the system's ability to detect, mitigate, and recover from dormant microcode threats with precision and efficiency.

Pseudocode exemplars for implementing various aspects of this disclosure are set forth below with explanations for reference.

Immutable Code Monitoring

The first step in implementing the system is establishing immutable code segments and continuously monitoring them for changes using hash and checksum validation. The pseudocode defines a process to create baselines for these segments, compare their current state with the baseline, and flag discrepancies.

a. Initialize ImmutableCodeSegments as a set of critical code sections
b. For each segment in ImmutableCodeSegments:
c. Calculate InitialChecksum=GenerateChecksum(segment)
d. Store InitialChecksum in ChecksumDatabase
e. While system is operational:
f. For each segment in ImmutableCodeSegments:
g. CurrentChecksum=GenerateChecksum(segment)
h. If CurrentChecksum!=InitialChecksum from ChecksumDatabase:
i. FlagDiscrepancy(segment)
j. TriggerMitigation(segment)

This pseudocode ensures that critical sections of the code are monitored continuously. Each segment's initial state is stored as a checksum, and periodic recalculations detect any unauthorized modifications. The 'FlagDiscrepancy' function identifies the compromised segment, while the 'TriggerMitigation' function activates the relevant mitigation protocols.

Hierarchical Hash and Checksum Validation

To extend the monitoring system's accuracy, hierarchical validation aggregates results across multiple levels.

a. Initialize CodeHierarchy as a tree of code segments
b. For each level in CodeHierarchy from leaves to root:
c. For each node in the current level:
d. ChildChecksums=GatherChecksums(node.children)
e. NodeChecksum=GenerateChecksum(node.content+ChildChecksums)
f. Store NodeChecksum in ChecksumDatabase
g. While system is operational:
h. For each level in CodeHierarchy from leaves to root:
i. For each node in the current level:
j. CurrentChecksum=GenerateChecksum (node.content+GatherChecksums(node.children))
k. If CurrentChecksum!=NodeChecksum from ChecksumDatabase:
l. FlagDiscrepancy(node)
m. TriggerMitigation(node)

This hierarchical approach builds a tree of code segments and validates each level by aggregating checksums from its child nodes. Any anomaly triggers an alert at the appropriate level, allowing for precise localization of the issue.

Behavioral Analysis with Large Language Models

The system employs large language models to analyze code behavior and detect anomalies.

a. Initialize LLM_Model with trained parameters for code behavior analysis
b. While system is operational:
c. For each code segment in MonitoredSegments:
d. BehavioralProfile=LLM_Model.AnalyzeBehavior (code segment)
e. ExpectedProfile=RetrieveExpectedProfile(segment)
f. If BehavioralProfile deviates significantly from ExpectedProfile:
g. FlagAnomaly(segment)
h. TriggerMitigation(segment)

This pseudocode outlines the use of an LLM to simulate and analyze the behavior of code segments. The 'AnalyzeBehavior' function evaluates operational patterns, and deviations from expected profiles are flagged as anomalies.

Mitigation Protocols

Mitigation strategies involve isolating or halting affected sections of the system to contain threats.

a. Function TriggerMitigation(segment):
b. If IsolationLevel=="micro":
c. IsolateSegment(segment)
d. Else If IsolationLevel=="mega":
e. IsolateNetwork(segment.network)
f. Else If IsolationLevel=="protective":
g. ShieldCriticalApplications( )
h. Else If IsolationLevel=="scorchedEarth":
i. TerminateAllProcessesWithGrowthAnomalies( )
j. RestoreFromBackup( )

This function dynamically applies mitigation strategies based on the severity and scope of the detected threat. The 'IsolateSegment', 'IsolateNetwork', and 'ShieldCriticalApplications' functions contain specific logic for containment, while the scorched earth policy halts all processes exhibiting unusual growth.

Real-Time Monitoring and Recovery

Real-time monitoring ensures immediate detection and response, while recovery mechanisms restore systems post-mitigation.

a. While system is operational:
b. MonitorForChanges(ImmutableCodeSegments)
c. AnalyzeBehavior(LLM_Model, MonitoredSegments)
d. If any threats detected:
e. TriggerMitigation(affected segments)
f. Function RestoreFromBackup( )
g. RetrieveVerifiedBackup( )
h. ReplaceCompromisedSegments( )
i. RevalidateSystemIntegrity( )

This pseudocode integrates monitoring and mitigation into a continuous loop, ensuring that threats are addressed as they arise. The 'RestoreFromBackup' function leverages pre-validated backups to return systems to a safe operational state.

As illustrated above, the pseudocode defines processes to implement each core aspect of the invention. It begins by monitoring immutable code segments, calculating checksums to detect any unauthorized changes. The hierarchical validation further extends the system's accuracy, enabling detection at multiple levels of the software architecture. Behavioral analysis, powered by large language models, adds a dynamic layer to the system by simulating and analyzing the operational context of the software.

Mitigation protocols ensure flexible and precise responses, ranging from isolating individual segments to implementing a scorched earth policy when necessary. Real-time monitoring is central to the system's operation, ensuring that threats are detected and addressed immediately. Finally, recovery mechanisms are integrated to restore compromised systems efficiently, minimizing disruption and ensuring operational continuity.

This pseudocode, while conceptual, provides a detailed framework for implementing the invention's innovative and multifaceted approach to detecting and mitigating dormant microcode threats.

A skilled artisan, upon reviewing the disclosure, will appreciate that the systems and methods described herein provide a robust framework for detecting and mitigating dormant microcode threats; however, there are numerous alternatives, modifications, combinations, and customizations that can be implemented without departing from the spirit and scope of the disclosure. These enhancements enable adaptability to diverse environments and evolving security challenges while leveraging the core principles of the invention.

One alternative involves replacing hierarchical hash and checksum validation with other cryptographic integrity checks, such as Merkle trees. A Merkle tree structure can provide an efficient and scalable way to verify the integrity of a large set of code segments, particularly in distributed systems. This modification enhances the performance of integrity checks in environments with high transaction volumes or significant codebase changes.

Behavioral analysis could be extended to include machine learning models other than large language models, such as recurrent neural networks (RNNs) or convolutional neural networks (CNNs). These models may be better suited for analyzing specific types of data or code behavior patterns. For example, RNNs could be used for sequential data analysis, identifying patterns in time-series logs generated by software processes.

Another customization includes incorporating real-time threat intelligence feeds to enhance anomaly detection capabilities. These feeds provide information about emerging threats, enabling the system to dynamically update its detection criteria and respond to new attack vectors. This addition enhances the adaptability of the system to rapidly evolving threats.

The mitigation protocols can also be modified to integrate automated patching mechanisms. When an anomaly is detected, the system could deploy a pre-approved patch to resolve the issue without requiring human intervention. This approach is particularly beneficial in environments where downtime is critical, such as in financial systems.

A combination of mitigation strategies could be applied to balance precision and effectiveness. For example, micro jamming could be used initially to isolate specific segments, followed by mega jamming if further analysis reveals a broader threat. This layered approach minimizes collateral damage while ensuring comprehensive containment of the threat.

The system could be customized to include industry-specific adaptations. For instance, in financial systems, immutable code segments could include transaction validation logic, ensuring that financial transactions remain secure and tamper-proof. Similarly, in industrial control systems, the immutable code segments could focus on critical control processes, safeguarding operational integrity.

Integration with blockchain or Holochain technology could provide an additional layer of security for tracking changes and verifying the integrity of immutable code segments. The decentralized and tamper-evident nature of these technologies aligns with the goals of the system, providing enhanced traceability and robustness against insider threats.

The hierarchical structure could be expanded to include distributed nodes in multi-cloud environments. By distributing validation processes across multiple nodes, the system enhances redundancy and fault tolerance. This modification ensures that no single point of failure can compromise the integrity of the detection and mitigation mechanisms.

The scorched earth policy could be modified to include dynamic risk assessment. Instead of terminating all processes with unusual growth, the system could analyze the potential impact of each process and prioritize those that pose the greatest risk. This approach reduces unnecessary disruptions while maintaining a high level of security.

Recovery mechanisms could be enhanced with continuous backup validation. In addition to storing verified backups, the system could periodically test these backups to ensure their integrity and readiness for deployment. This proactive approach minimizes the risk of failures during restoration and ensures faster recovery times.

Alternative implementation environments could include embedded systems or Internet of Things (IoT) devices. In these contexts, the system could be customized to operate within resource-constrained environments, optimizing for low power consumption and limited processing capacity. This adaptation ensures the applicability of the invention to a broader range of devices and systems.

The system could also incorporate user-configurable sensitivity levels for detection and mitigation. Administrators could customize thresholds and responses based on the specific risk tolerance and operational requirements of their organization. This flexibility ensures that the system can align with diverse security policies and operational priorities.

Further modifications include leveraging quantum-safe cryptographic algorithms for hash and checksum calculations. As quantum computing advances, traditional cryptographic methods may become vulnerable. Adopting quantum-resistant algorithms ensures the long-term viability and security of the system in a post-quantum environment.

Combining the invention with endpoint detection and response (EDR) tools or security information and event management (SIEM) systems enhances situational awareness. The integration allows for centralized monitoring and response, providing a holistic view of the organization's security posture and enabling coordinated actions against detected threats.

Additionally, future adaptations could include artificial intelligence-driven self-healing mechanisms. By analyzing detected anomalies, the system could propose or implement corrections autonomously, improving resilience and reducing the need for manual intervention. This approach aligns with the system's goals of minimizing disruptions and maintaining operational continuity.

These alternatives, modifications, combinations, and customizations demonstrate the versatility and extensibility of the systems and methods described herein. Each variation remains consistent with the core principles of the invention, ensuring that the solution can address a wide range of security challenges and adapt to diverse operational contexts. All are within the scope of this invention and this disclosure.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for detecting and mitigating dormant microcode threats embedded within a software system, comprising:

initializing, by a configuration module, a plurality of immutable code segments within the software system, wherein each immutable code segment is designated as critical and unchanging under normal operational conditions;

generating, by a hashing module, an initial checksum for each immutable code segment using a cryptographic hash function selected from the group consisting of SHA-256, SHA-3, and Blake2, wherein the cryptographic hash function is dynamically selected based on computational resources available to the software system, and storing the initial checksum in a checksum database;

continuously monitoring, by a monitoring module, each said immutable code segment during operation of the software system by periodically generating a current checksum for each said immutable code segment and comparing the current checksum with the initial checksum stored in the checksum database;

identifying, by an anomaly detection module, one of said immutable code segment as modified if the current checksum deviates from the initial checksum by a deviation exceeding a predefined threshold;

analyzing, by a behavior analysis module comprising a large language model, operational behaviors of code segments within the software system, generating behavioral profiles for each of the code segments, and detecting anomalies by comparing the behavioral profiles with predefined expected profiles;

aggregating, by a hierarchical validation module, checksums and behavioral analysis results across multiple levels of a hierarchical structure representing the software system, wherein the hierarchical validation module employs a Merkle tree structure to enable efficient verification of integrity of code segments and outputs aggregated validation results to higher levels of the hierarchy;

initiating, by a mitigation module, a mitigation protocol upon detection of a genuine threat, the mitigation protocol comprising at least one of: isolating an affected code segment using micro jamming, isolating a broader system region including the affected code segment using mega jamming, shielding critical applications using protective jamming, or terminating processes exhibiting unusual growth patterns using a scorched earth policy;

restoring, by a recovery module, affected portions of the software system by retrieving verified backups from a disaster recovery database and replacing compromised code segments with backup versions, wherein the recovery module further validates the operational functionality of restored code segments using simulation-based tests that replicate real-world operational conditions;

validating, by the hierarchical validation module, the integrity of a restored software system by recalculating checksums for restored code segments and verifying consistency with stored initial checksums in the checksum database; and adapting, by the configuration module, the predefined expected profiles and checksum parameters dynamically in response to newly detected threats, wherein the adaptation incorporates external threat intelligence feeds and new threat signatures to enhance detection capabilities.

2. The method of claim 1, wherein the monitoring module further comprises a time-scheduled scanning component configured to adjust a frequency of checksum comparisons based on system activity levels, wherein higher activity levels result in increased monitoring frequency.

3. The method of claim 2, wherein the hashing module employs a cryptographic hash function selected from the group consisting of SHA-256, SHA-3, and Blake2, wherein the cryptographic hash function is chosen dynamically based on the computational resources available to the software system.

4. The method of claim 3, wherein the anomaly detection module includes a thresholding mechanism that evaluates a degree of deviation between the current checksum and the initial checksum to determine whether the modification constitutes a false positive or a genuine threat.

5. The method of claim 4, wherein the behavior analysis module is further configured to detect coordinated anomalies across multiple code segments by identifying recurring patterns indicative of distributed dormant microcode threats.

6. The method of claim 5, wherein the hierarchical validation module further employs a Merkle tree structure to aggregate checksums, enabling efficient verification of the integrity of the software system at multiple levels of the hierarchy.

7. The method of claim 6, wherein the mitigation module further comprises an adaptive decision-making component configured to select the mitigation protocol based on a severity score calculated from the anomaly detection module and behavior analysis module.

8. The method of claim 7, wherein the recovery module is further configured to validate the operational functionality of restored code segments using simulation-based tests that replicate real-world operational conditions.

9. The method of claim 8, wherein the configuration module is further configured to interface with external threat intelligence feeds, incorporating new threat signatures into the predefined expected profiles and enhancing the adaptability of the behavior analysis module.

10. The method of claim 9, wherein the behavior analysis module employs a reinforcement learning algorithm to iteratively improve its anomaly detection accuracy based on feedback from the mitigation module, wherein the feedback includes success metrics for containment and restoration actions.

11. A method for detecting and mitigating dormant microcode threats embedded within a software system, comprising:

initializing, by a configuration module, a plurality of immutable code segments within the software system, wherein each immutable code segment is designated as critical and unchanging under normal operational conditions;

generating, by a hashing module, an initial checksum for each immutable code segment using a cryptographic hash function selected from the group consisting of SHA-256, SHA-3, and Blake2, wherein the cryptographic hash function is dynamically selected based on computational resources available to the software system, and storing the initial checksum in a checksum database;

continuously monitoring, by a monitoring module, each immutable code segment during operation of the software system by periodically generating a current checksum for each of said immutable code segments, wherein a monitoring frequency is dynamically adjusted by a time-scheduled scanning component based on system activity levels, and comparing the current checksum with the initial checksum stored in the checksum database;

identifying, by an anomaly detection module, one of said immutable code segments as modified if the current checksum deviates from the initial checksum by a deviation exceeding a predefined threshold, and classifying the modification as a genuine threat or a false positive based on a degree of deviation;

analyzing, by a behavior analysis module comprising a large language model, operational behaviors of code segments within the software system, generating behavioral profiles for each code segment, and detecting anomalies by comparing the behavioral profiles with predefined expected profiles, wherein the behavior analysis module is further configured to detect coordinated anomalies across multiple code segments by identifying recurring patterns indicative of distributed dormant microcode threats;

aggregating, by a hierarchical validation module, checksums and behavioral analysis results across multiple levels of a hierarchical structure representing the software system, wherein the hierarchical validation module employs a Merkle tree structure to enable efficient verification of integrity of the code segments at multiple levels and outputs aggregated validation results to higher levels of the hierarchy;

initiating, by a mitigation module, a mitigation protocol upon detection of a genuine threat, the mitigation protocol comprising at least one of: isolating an affected code segment using micro jamming, isolating a broader system region including the affected code segment using mega jamming, shielding critical applications using protective jamming, or terminating processes exhibiting unusual growth patterns using a scorched earth policy, wherein the mitigation protocol is dynamically selected by an adaptive decision-making component based on a severity score calculated from anomaly detection and behavior analysis results;

restoring, by a recovery module, affected portions of the software system by retrieving verified backups from a disaster recovery database and replacing compromised code segments with backup versions, wherein the recovery module further validates the operational functionality of restored code segments using simulation-based tests that replicate real-world operational conditions;

validating, by the hierarchical validation module, the integrity of a restored software system by recalculating checksums for restored code segments and verifying consistency with stored initial checksums in the checksum database;

adapting, by the configuration module, the predefined expected profiles and checksum parameters dynamically in response to newly detected threats, wherein the adaptation incorporates external threat intelligence feeds and new threat signatures to enhance detection capabilities of the behavior analysis module; and employing, by the behavior analysis module, a reinforcement learning algorithm to iteratively improve its anomaly detection accuracy based on feedback from the mitigation module, wherein the feedback includes success metrics for containment and restoration actions, ensuring improved performance in detecting and mitigating future threats.

12. A system for detecting and mitigating dormant microcode threats embedded within a software system, comprising: a processing circuitry; a memory, the memory containing a plurality of modules, when executed by the processing circuitry, comprising:

a configuration module configured to initialize a plurality of immutable code segments within the software system, wherein each immutable code segment is designated as critical and unchanging under normal operational conditions, and dynamically adapt predefined expected profiles and checksum parameters in response to newly detected threats;

a hashing module configured to generate an initial checksum for each immutable code segment using a cryptographic hash function selected from the group consisting of SHA-256, SHA-3, and Blake2, wherein the cryptographic hash function is dynamically selected based on computational resources available to the software system, and to store the initial checksums in a checksum database;

a checksum database configured to store the initial checksums for subsequent comparisons during monitoring;

a monitoring module configured to continuously monitor each immutable code segment by periodically generating current checksums for each immutable code segment and comparing the current checksums with the initial checksums stored in the checksum database, wherein the monitoring module includes a time-scheduled scanning component that dynamically adjusts a checksum frequency of checksum comparisons based on system activity levels;

an anomaly detection module configured to evaluate deviations between current checksums and initial checksums, assign threat scores to detected anomalies based on factors including a degree of deviation, the criticality of the code segment, and an anomaly frequency of anomalies, and classify modifications as genuine threats or false positives;

a behavior analysis module configured to generate operational behavioral profiles for code segments, compare these profiles to predefined expected profiles to detect behavioral anomalies, and identify coordinated anomalies across multiple code segments by detecting recurring patterns indicative of distributed dormant microcode threats, wherein the behavior analysis module is further configured to incorporate a reinforcement learning engine to iteratively improve anomaly detection accuracy;

a hierarchical validation module configured to aggregate checksums and behavioral analysis results across multiple levels of a hierarchical structure representing the software system, wherein the hierarchical validation module employs a Merkle tree structure to enable efficient verification of integrity at multiple levels and outputs aggregated validation results to higher levels;

a mitigation module configured to initiate a mitigation protocol upon detection of a genuine threat, wherein the mitigation protocol comprises at least one of: isolating the affected code segment using micro jamming, isolating a broader system region including the affected code segment using mega jamming, shielding critical applications using protective jamming, or terminating processes exhibiting unusual growth patterns using a scorched earth policy;

a recovery module configured to restore affected portions of the software system by retrieving verified backups from a disaster recovery database and replacing compromised code segments with backup versions, wherein the recovery module further validates the operational functionality of restored code segments using simulation-based tests that replicate real-world operational conditions; and an external threat intelligence interface configured to integrate external threat intelligence feeds into the behavior analysis module and configuration module, enabling the incorporation of new threat signatures to enhance detection and adaptability.

13. The system of claim 12, wherein the hashing module further comprises a dynamic optimization component configured to switch between cryptographic hash functions based on real-time performance metrics and resource availability of the software system.

14. The system of claim 13, wherein the monitoring module further includes a machine learning model configured to predict optimal time intervals for checksum comparisons based on historical system activity data and operational trends.

15. The system of claim 14, wherein the anomaly detection module is further configured to evaluate a risk level of identified modifications by assigning a threat score to each detected deviation, wherein the threat score is based on factors including a deviation size of the deviation, the criticality of an affected code segment, and the anomaly frequency of anomalies detected within a predefined time window.

16. The system of claim 15, wherein the behavior analysis module further includes a simulation component configured to emulate the operational impact of detected anomalies on the software system to determine a likelihood of malicious behavior.

17. The system of claim 16, wherein the hierarchical validation module further incorporates a parallel processing architecture configured to accelerate the aggregation and validation of checksums and behavioral analysis results across distributed components of the hierarchical structure.

18. The system of claim 17, wherein the mitigation module is further configured to dynamically adjust a scope of mitigation protocols based on a contextual analysis of the anomaly, wherein the contextual analysis includes evaluating interdependencies between the affected code segment and other system components.

19. The system of claim 18, wherein the recovery module further includes a predictive analytics component configured to estimate the time required for restoration based on a segment size of the affected code segments, complexity of the software system, and the availability of verified backups in the disaster recovery database.

20. The system of claim 19, wherein the external threat intelligence interface is further configured to categorize threat intelligence feeds into predefined threat classifications, wherein each classification is mapped to specific updates in the behavior analysis module and the anomaly detection module to enhance targeted threat detection and response capabilities.

* * * * *